(12) United States Patent
Dessing

(10) Patent No.: US 6,622,651 B1
(45) Date of Patent: Sep. 23, 2003

(54) DEVICE AND METHOD FOR THE AUTOMATIC MILKING AND FEEDING OF ANIMALS

(75) Inventor: Jacobus Petrus Maria Dessing, Hoofddorp (NL)

(73) Assignee: Prolion B.V., Vifthuizen (NL)

( * ) Notice: Subject to any disclaimer, the term of this patent is extended or adjusted under 35 U.S.C. 154(b) by 0 days.

(21) Appl. No.: 09/807,528

(22) PCT Filed: Oct. 14, 1999

(86) PCT No.: PCT/NL99/00637

§ 371 (c)(1),
(2), (4) Date: Jun. 4, 2001

(87) PCT Pub. No.: WO00/22919

PCT Pub. Date: Apr. 27, 2000

(30) Foreign Application Priority Data

Oct. 16, 1998 (NL) .............................................. 1010330

(51) Int. Cl.[7] ................................ A01J 3/00; A01J 5/00
(52) U.S. Cl. ................................................... 119/14.08
(58) Field of Search ........................... 119/14.01, 14.02, 119/14.03, 14.08

(56) References Cited

U.S. PATENT DOCUMENTS

| 5,140,942 A | * | 8/1992 | Flocchini | 119/14.02 |
| 5,782,199 A | * | 7/1998 | Oosterling | 119/14.02 |
| 5,832,868 A | * | 11/1998 | Oosterling | 119/14.02 |
| 6,062,164 A | * | 5/2000 | Oosterling | 119/14.02 |
| 6,257,169 B1 | * | 7/2001 | Oosterling | 119/14.02 |

FOREIGN PATENT DOCUMENTS

| NL | 8903163 | 12/1989 |
| WO | WO 9603031 | 2/1996 |

* cited by examiner

Primary Examiner—Charles T. Jordan
Assistant Examiner—Judith A. Nelson
(74) Attorney, Agent, or Firm—St.Onge Steward Johnston & Reens LLC

(57) ABSTRACT

The invention relates to a device and method for the automatic milking of animals. The animals enter the milking stall (5) from a gathering area (A) via an access path (B). The milking stall comprises a feeding device (7) and automatic milking equipment (6). After they have been milked, the animals leave the milking stall via an exit path (C) and move to the living area (D). According to the invention, a feeding stall (20) for supplying an amount of feed which is determined by the control system is incorporated in the exit path.

8 Claims, 2 Drawing Sheets

DEVICE AND METHOD FOR THE AUTOMATIC MILKING AND FEEDING OF ANIMALS

The invention relates to a device according to the preamble of claim 1. A device of this nature is known from WO 9603031. A drawback of the known device is that for some animals the period of residence in the milking stall may be short, so that they cannot be fed with sufficient concentrated feed. This means that additional concentrated feed then has to be given, for example in feeding boxes which are positioned separately from the milking device and in which the animal has to be identified again This requires a separate device, with an additional relatively expensive identification system, thus constituting a drawback.

The object of the invention is to eliminate this drawback, and to this end the device is designed in accordance with the characterizing feature of claim 1. By identifying the animals prior to milking and guiding the identified animal to a feeding stall and feeding it further in that stall, it is possible to make efficient use of the milking stall while obviating the need for an additional identification system. Also, the identified animal can be guided direct to the feeding stall without having to visit the milking stall.

According to a refinement, the device is designed in accordance with claim 2. In this way, animals which have been milked can easily be guided past the feeding stall.

According to a further refinement, the device is designed in accordance with claim 3. In this way, the animal which has been fed can leave the feeding stall without affecting the movement of other animals which have left a milking stall.

According Go a further refinement, the device is designed in accordance with claim 4. This ensures that a feeding stall is generally available for animals which have been milked after the end of the milking operation, so that a waiting time in the milking stall is as far as possible avoided and the milking stall can be used as efficiently as possible.

According to a refinement, the device is designed in accordance with claim 5. In this way, it is possible to use a single identification system to request or record all the information which is to be assigned to a specific animal.

The invention also comprises a method according to claim 6. This allows the milking stall to be utilized as efficiently as possible for milking and feeding.

A further refinement to the method is given in accordance with claim 7. The fact that the animals are already being fed in the milking stall while they are waiting for the feeding stall to become available prevents an animal which has been milked from becoming agitated.

Another improvement to the method is given in accordance with claim 8. This ensures that the milking stall is used as efficiently as possible for milking.

The invention will now be explained with reference to an exemplary embodiment, in which.

Figure 1:
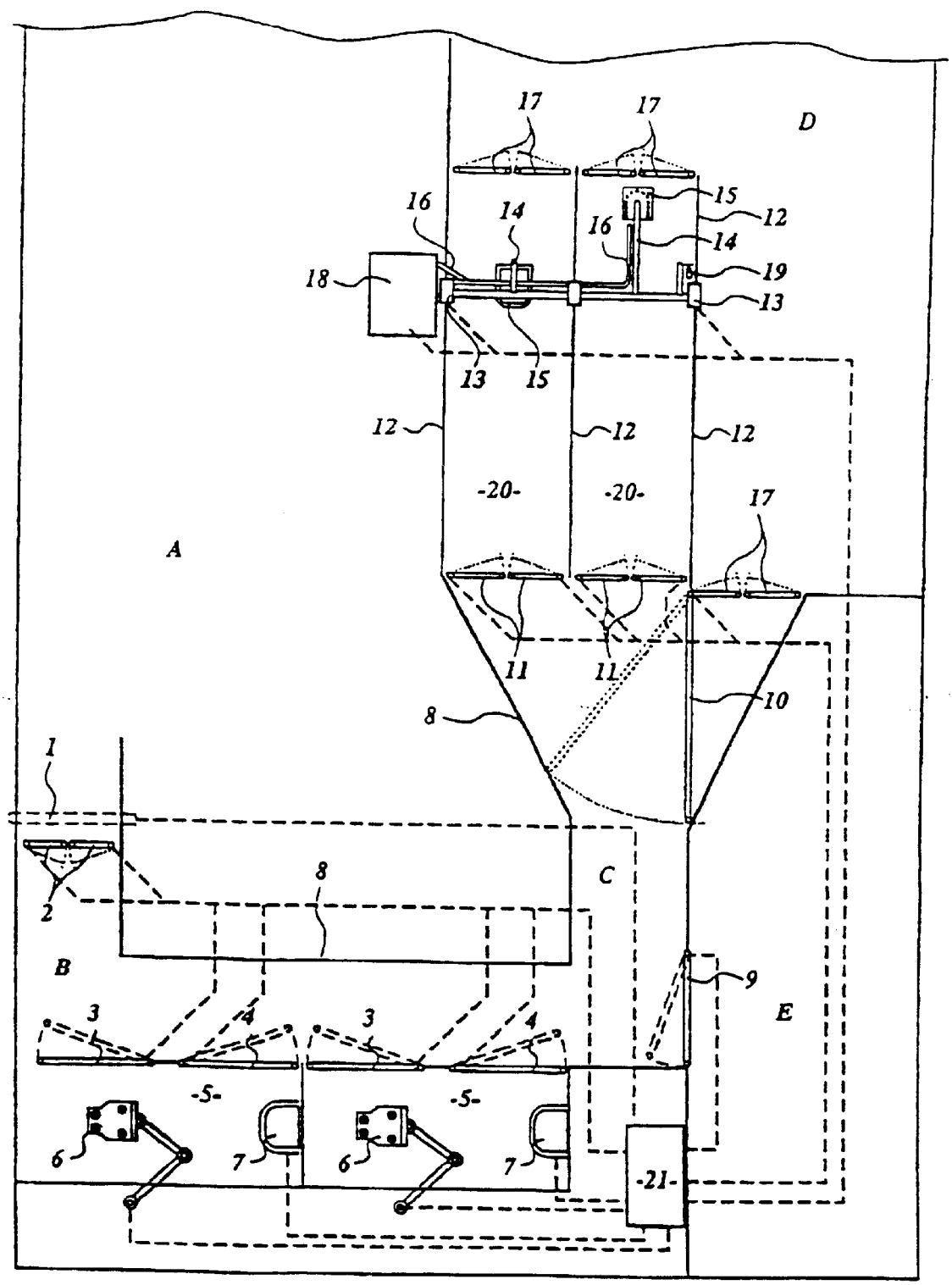
FIG. 1 shows a diagrammatic plan view of a milking device.

FIG. 1 diagrammatically depicts a milking device for milking and feeding animals, such as for example cows. The animals move towards the milking device and wait in a gathering area A until they are admitted for milking or feeding. An access path B is provided with an identification system 1 which interacts, in a known way, with transponders which are worn by the animals. The identification system 1 recognizes and identifies a transponder and transmits the identity of the animal standing in front of an access gate 2 to a control unit 21. The access gate 2 is the start of the access path B to a milking stall 5. Each milking stall 5 is provided with an entry gate 3 and an exit gate 4. A feeding trough 7 into which enticement feed or concentrated feed can be tipped in a manner not shown, is arranged in the milking stall 5; in the control unit 21, it is possible to record how much feed has been given to the animal which is present in the milking stall 5. The milking stall 5 is provided with diagrammatically depicted milking equipment 6 which can be automatically connected, in a known way, to the teats of the udder of the animal which is to be milked. If appropriate, the feeding trough 7 may be provided with means which are known per se and with which the feeding trough 7 can be covered or with which the head of the animal which is present in the milking stall 5 can be pushed out or the feeding trough 7, so that she urge to remain in the milking stall 5 is eliminated and the animal will seek to leave the milking stall 5. Instead of or in addition to the identification system 1, it is possible for each milking stall 5 to be provided with an identification system with which it is also possible, for example, to establish the presence of the animal.

In front of the milking stall 5, there is a path which is separated from the gathering area A by a fence 8. This path is partially the access path B from the living area A to the entry gates 3 of the milking stalls 5 and is also the exit path C from the exit gates 4 to a living area D. The exit path C is provided with a separating gate 9, which is actuated by the control unit 21 and with which an animal which has left the milking stall 5 can be guided to a separating area E. In the separating area E, those animals which require extra attention, for example as a result of a disease having been observed, are collected. The exit path C is also provided with a sorting gate 10 which is actuated by the control unit 21 and with which an animal can be guided, via a one-way gate 17, to the living area D or is guided, via an entry gate 11 which may be actuated by the control unit 21, into a feeding stall 20.

Figure 2:
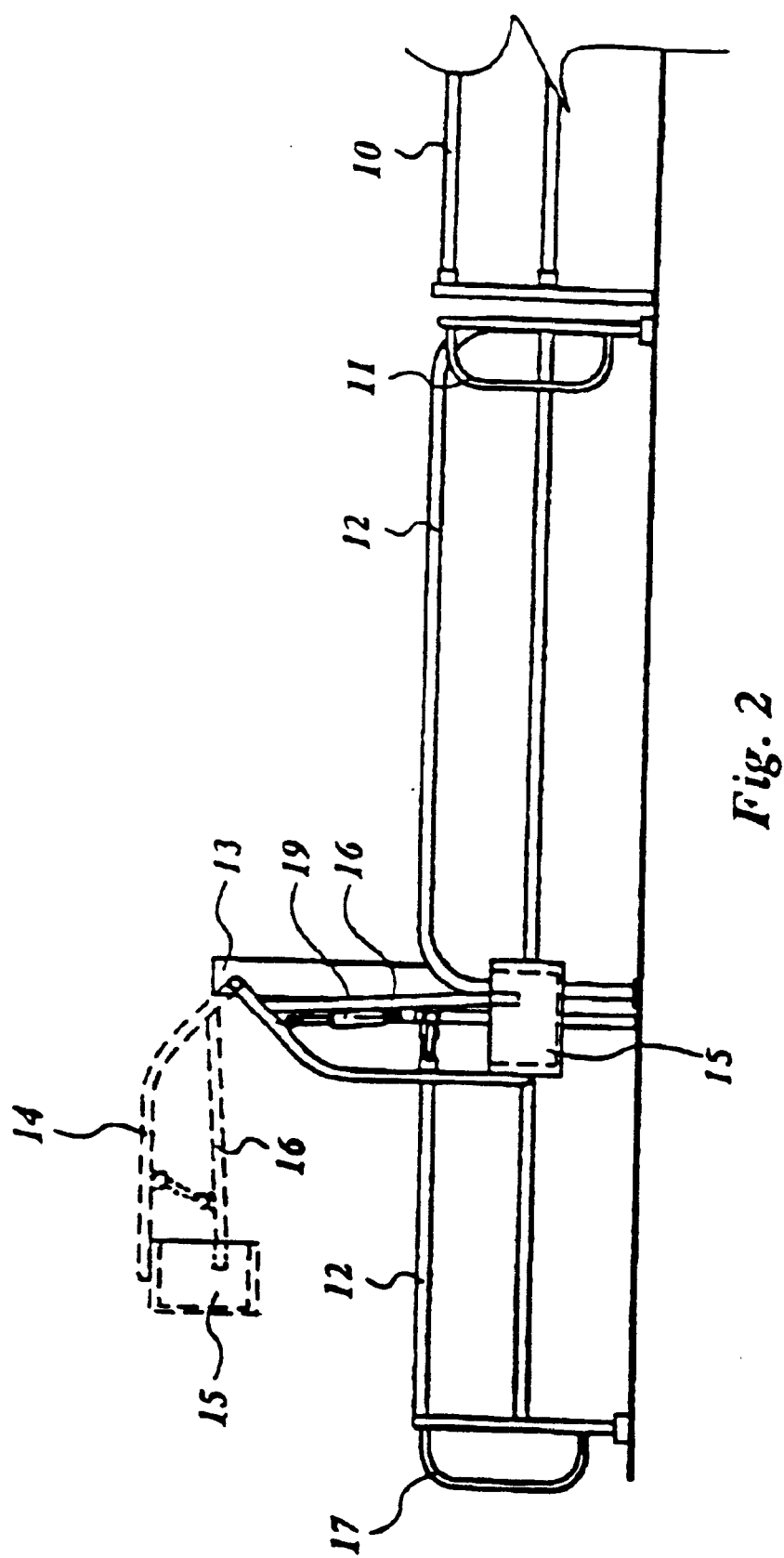
FIG. 2 shows a diagrammatic side view of the feeding stall from FIG. 1.

The feeding stall 20 which is shown in side view in FIG. 2 is provided with side gates 12 and, on the side remote from the entry fence 11, with a feeding trough 15 which is attached to a bracket 14. The bracket 14 is rotatably attached to supports 13 and is able to rotate about a horizontal axis using a cylinder 19. When the bracket 14 has been moved downwards, the animal which is present in the feeding stall 20 can eat out of the Feeding rough 15. When the bracket 14 has been moved upwards, the animal can move through beneath the feeding trough 15 and into the living area D via a one-way gate 17. Via a feed line 16, the feeding trough 15 is connected to a feeding appliance 18. If appropriate, the feeding trough 15 may be provided with a sensor (not shown) which can be used to detect whether the concentrated feed supplied has been or is being eaten or whether concentrated feed is still present in the feeding trough 15.

The various components of the device are controlled by the control system 21. The connections between this control system. 21 and the various components are indicated by dashed lines in FIG. 1. In the figures, the actuating members of the fences, gates, milking device and feeding trough are not shown, or are only shown to a limited extent. Other means which may be required, such as those with which the animals which are to be milked are stimulated to move along the paths, and the means with which the positions and progress of the animals past the various components can be established, are not shown, since they are known to the person skilled in the art.

The device operates as follows. An animal walks to the access gate 2, because it wishes to be milked. When a milking stall 5 is available, its entry gate 3 is opened, followed by the access gate 2. While the animal is walking towards the milking stall 5, and if the identification system 1 is positioned in front of the access gate 2 before he access gate 2 is opened, the animal is identified by means of the identification system 1. The control unit 21 establishes which animal is present in a specific milking stall 5, possibly also with the aid of an identification system which is present there. With reference to the information which is known in the control unit 21 for this animal, it is established what type(s) and quantity of concentrated feed will be supplied to he animal. This depends, for example, on the age of the animal, the duration of lactation, the time which has elapsed since the animal was last fed and, for example, the time of day. During milking, concentrated feed is supplied in the feeding trough 7. The milking cups of the milking equipment 6 are automatically connected to the teats of the udder by means of a milking robot (not shown), and milking commences.

After milking, has finished, in that it is observed, in a known manner, that there is no more milk coming out of the udder, the milking cups are removed. It is then established how much concentrated feed the animal which has been milked still has to eat. If this quantity is negligible, the sorting gate 10 is moved into a position which is such that ate animal which has been milked is guided out of the entry gate 4 directly to the living area D. If the amount to be eaten is sufficiently high, which will often be the case with cows, since the time which they require to eat is generally longer than the time required for milking, the animal which has been milked as guided to a feeding stall 20. The feeding, stall 20 is made ready by moving the feeding trough, 15 downwards and opening the entrance gate 11. The sorting gate 10 is moved into the position in which the animals which have been milked are guided towards the feeding stalls 20, the exit gate 4 is opened, and then the animal which has been milked walks towards the feeding stall 20.

After the animal has arrived in the feeding stall 20, the amount of concentrated feed to be supplied, which has been established by the control system, is given to the animal which has been milked via the metering equipment 18. After the animal has been given all the concentrated feed to which it was entitled, the exit from the feeding stall 20 is opened by the feeding trough 15 being moved upwards, after which the animal can leave the feeding stall 20.

If the animal does not wish to eat all the concentrated feed supplied, or is eating extremely slowly, this can be detected by the abovementioned sensor, after which the supply of feed is stopped or slowed. If appropriate, the animal may be given the remainder of the concentrated feed as extra when it is next milked. Also, should this happen repeatedly, the control unit 21 can provide the operating personnel with a warning, or the animal can be separated in the separating area E.

In the example described above, a feeding stall 20 was available at the end of the milking operation. If there is no feeding stall 20 available, the animal which has been milked can be guided direct to the living area D and is given a further opportunity to receive concentrated feed during its next visit to the milking device. In this method, the milking stall 5 is utilized as efficiently as possible. The control unit 21 may also be set in such a way that, for example during certain periods of the day when there are few visits to the milking stall 5, the animal are fed in the milking stall 5 until a feeding stall 20 becomes available.

As indicated above, it is possible that an animal may have eaten all the concentrated feed which is to be given while it is still in the milking stall. In that case, the sorting gate 10 is positioned in such a manner that the animal which has been milked can be guided direct to the living area D without entering the feeding stall 20.

In addition to the situation described above, it is also possible that an animal which does not have to be milked may enter the milking device. This may arise if it has just been milked, but also if it is no longer lactating and is therefore dry. In this situation too, this animal may still be entitled to concentrated feed. After he identification system 1 has established the identity of the animal and it has been observed in the control unit 21 that the milking stall 5 does not have to be visited, the entry gate 3 and the exit gate 4 are kept closed, and sorting gate 10 is moved into the position in which the animal is guided directly through to the living area D or in which it is guided into a feeding stall 20 for concentrated feed to be supplied. It is then allowed through as a result of the access gate 2 being opened.

The number of milking stalls 5 contained in the device is determined on the basis of the size of the herd The number of feeding stalls 20 is determined on the basis of the additional concentrated feed which the farmer wishes to give to his cows and the time which they require to eat this feed. In, general, the number of feeding stalls 20 will be at least equal to the number of milking stalls 5.

In the exemplary embodiment described above, the access gates 11 and the feeding trough 15 are each actuated separately. By mechanically coupling the movements of the access gate 11 to those of the feeding trough 15, it is possible to dispense with one actuating member. In this case, the mechanical coupling is set in such a manner that the access gate 1 is closed when the feeding trough 15 opens the passage leading to the living area D, and the access gate 11 is open when the passage to the living area D is closed by the feeding trough 15.

What is claimed is:

1. Device for automatically milking and feeding animals, comprising at least one milking stall (5) having means (6) for the automatic milking of animals, and having means (7) for feeding animals during milking, an access path (B) along which an animal, can enter the device and walk to the milking stall (5), an exit path (C), along which an animal can exit the milking stall (5), first guiding means (2,3,8) for guiding animals along the access path (B), second guiding means (4, 8, 10) for guiding animals to the exit path (C), a feeding stall (20) for feeding animals, a control system (21) for controlling the milking, feeding and movement of animals and an identification system (1), which is connected to the control system, for identifying individual animals, characterized in that third guiding means (1, 10, 11) are provided for guiding an identified animal from the exit path (C) to a specific feeding stall (20), and the feeding stall (20) is provided with metering equipment (18) for providing an amount of feed which has been determined by the control system (21).

2. Device according to claim 1, characterized in that the exit path (C) comprises an exit (10, 17) which is actuated by the control system, for enabling animals to leave the exit path (C) without feeding.

3. Device according to claim 1, characterized in that the feeding stall comprises an entry (11), which is accessible from the exit path (C), and a different exit (17).

4. Device according to claim 1, characterized in that the number of feeding stalls (20) is at least as great as the number of milking stalls (5).

5. Device according to claim 1, in which the access path (B) is provided with an access gate (2) and the identification system (1) positioned in front of it, characterized in that there are means (21) for following the position of an identified animal in any one of the access path (B), a milking stall (5), the exit path (C) and a feeding stall (20).

6. Method for the automatic milking and feeding of animals in a device in which after an animal is identified and it is established whether this animal is to be milked and fed or only fed, the guiding means are adjusted for guiding the animal to either an available milking stall (5) or an available feeding stall (20) having metering equipment.

7. Method according to claim 6, comprising an animal in a milking stall (5), while during its period in the milking stall (5), providing said animal with concentrated feed and, after milking, guiding said animal out of the milking stall (5) when either a feeding stall (20) has become available or sufficient concentrated feed was provided to said animal.

8. Method according to claim 6, comprising providing an animal during milking with concentrated feed and, after milking is complete, iif no feeding stall (20) is available for feeding the animal, guiding said animal out of the milking stall (5) directly to the exit (10, 17).

* * * * *